United States Patent [19]

Plocher

[11] Patent Number: 4,632,653
[45] Date of Patent: Dec. 30, 1986

[54] PRESS WITH A PLURALITY OF INJECTION PLUNGERS

[75] Inventor: Werner Plocher, Horb, Fed. Rep. of Germany

[73] Assignee: Maschinenfabrik Lauffer GmbH & Co. KG., Horb, Fed. Rep. of Germany

[21] Appl. No.: 658,591

[22] Filed: Oct. 5, 1984

[30] Foreign Application Priority Data

Oct. 5, 1983 [DE] Fed. Rep. of Germany ....... 3336173

[51] Int. Cl.$^4$ .............. B29C 3/00; B29F 1/06
[52] U.S. Cl. .................... 425/149; 425/117; 425/127; 425/129 R; 425/573; 425/588
[58] Field of Search .............. 425/146, 149, 557, 570, 425/572, 581, 588, 110, 116, 117, 128, 127, 129 R, 573, 555, 808, 544; 264/328.4, 2.2, 272.13, 272.17; 29/588

[56] References Cited

U.S. PATENT DOCUMENTS

| | | | |
|---|---|---|---|
| 2,470,402 | 5/1949 | Jobst | 425/149 |
| 2,582,891 | 1/1952 | Strauss | 425/556 |
| 3,278,992 | 10/1966 | Strauss | 264.1/328.4 |
| 4,008,031 | 2/1977 | Weber | 425/808 |
| 4,091,057 | 5/1978 | Weber | 264/2.2 |
| 4,347,211 | 8/1982 | Bandoh | 264/328.4 |
| 4,372,740 | 2/1983 | Kuramochi et al. | 425/544 |
| 4,386,898 | 6/1983 | Sera | 264/328.4 |
| 4,511,317 | 4/1985 | Bandoh | 264/272.17 |

*Primary Examiner*—Willard E. Hoag
*Attorney, Agent, or Firm*—Michael J. Striker

[57] ABSTRACT

A press with a plurality of injection plungers, which can be used to enclose integrated circuits in plastics packages, is provided with additional compensating pistons. The lower ends of the compensating pistons and the upper ends of the injection plungers project into a filling pot in which the plastics material is molded. The injection plungers force the plastics material in the injection mold through channels into cavities provided in the mold. When a predetermined pressure $P_k$ is exceeded, the compensating pistons retreat, so that a pressure drop and, thus, pressure limitation occur. In this manner, scrap would be avoided even if too large a quantity of plastics material were placed in the filling pot.

4 Claims, 3 Drawing Figures

PRESS WITH A PLURALITY OF INJECTION PLUNGERS

BACKGROUND OF THE INVENTION

The present invention relates to a press which comprises a plurality of injection plungers for simultaneously producing a plurality of moldings of plastics, particularly for producing packages of semiconductor circuits, and at least one injection mold, in the filling space of which a heated mold mass is pressed by each of the injection plungers through channels into associated cavities of the mold.

Presses comprising a plurality of injection plungers for producing packages of semiconductor integrated circuits are known. The semiconductor circuits, e.g. "chips", are mounted on a common metal strip which is placed in the injection mold. The mold is closed, and the semiconductor chips in the cavities, upon a molding process, are each enclosed in a separate plastic package. The plastics preferably used for this purpose are thermosetting plastics.

Such a press, in which an injection plunger is associated with a cavity, is disclosed in U.S. Pat. No. 4,347,211. For excess plastics material, each cavity communicates with a separate filling space or pot of the mold through a thin channel. If the plastics material to be molded was not exactly measured out, the excess plastics material is to flow off through the channels to the separate pots. However, these separate pots have an uncontrollable influence on the molding pressure; they make it impossible to keep any fairly exact limit of a molding pressure.

SUMMARY OF THE INVENTION

It is an object of the invention to provide a press of the foregoing type, wherein pressure limitations can be obtained in the mold when a predetermined molding pressure has been reached.

This and other objects of the invention are attained by a press for simultaneously producing a plurality of moldings of plastics material, particularly for producing packages of semiconductor circuits, comprising a plurality of injection plungers; at least one injection mold having a plurality of filling pots to be filled with a plastics material, a plurality of channels each connected to the associated pot, and a plurality of cavities each connected to the associated channel, each of said injection plungers forcing a heated molding material in the associated pot through the associated channel into the associated cavity; at least a few of the injection plungers being provided with a common drive for forcing said plungers into the associated pots; and a plurality of pressure-compensating pistons adjoining the respective pots of said injection mold and being each associated with each of the injection plungers in such a manner that, when a predetermined maximum pressure is reached in the respective pot each of the compensating pistons slightly retreats independently from the other compensating pistons to cause a pressure reduction in said pot.

To be able to effect pressure equalization, an upper compensating piston is preferably associated with each of the injection plungers in the axial extension of the plunger, arranged below the mold. The lower end of each compensating piston and the upper end of each injection plunger form a portion of the boundary surfaces of the filing space or pot in which the plastics material is molded. Each compensating piston is held in its lower position by a constant maximum pressure. When this maximum pressure is exceeded in the pot, the compensating piston moves slightly upwards. In this manner, the desired pressure limitation is provided when a maximum pressure is exceeded.

The arrangement in which the injection plunger and the associated compensating piston may have a common central axis represents only one of the possible implementations. Depending on the application, one compensating piston may be associated with two or more cavities or each cavity may be assigned to a separate compensating piston.

A particularly advantageous aspect of the invention is characterized in that each of the compensating pistons is actuated by a hydraulic cylinder, that the pressure chambers of the hydraulic cylinders are connected with one another, and that a common pressure limiter is connected to the pressure chambers. The compensating pistons thus work against a fixed predetermined pressure which is determined by the common pressure limiting member. When this predetermined pressure is exceeded in any of the pots, the assocaited compensating piston retreats slightly, so that a pressure drop and, thus, pressure equalization occur in this pot.

Although all compensating pistons are monitored by a common pressure, individual pressure limitation is provided in each of the filling pots if the set pressure is reached.

The maximum molding pressure can be set by means of the pressure limiter so that a pressure reduction is effected during about the last ten percent of the injecting operation. In this manner, high-quality injection-molded parts are obtained and scrap is avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
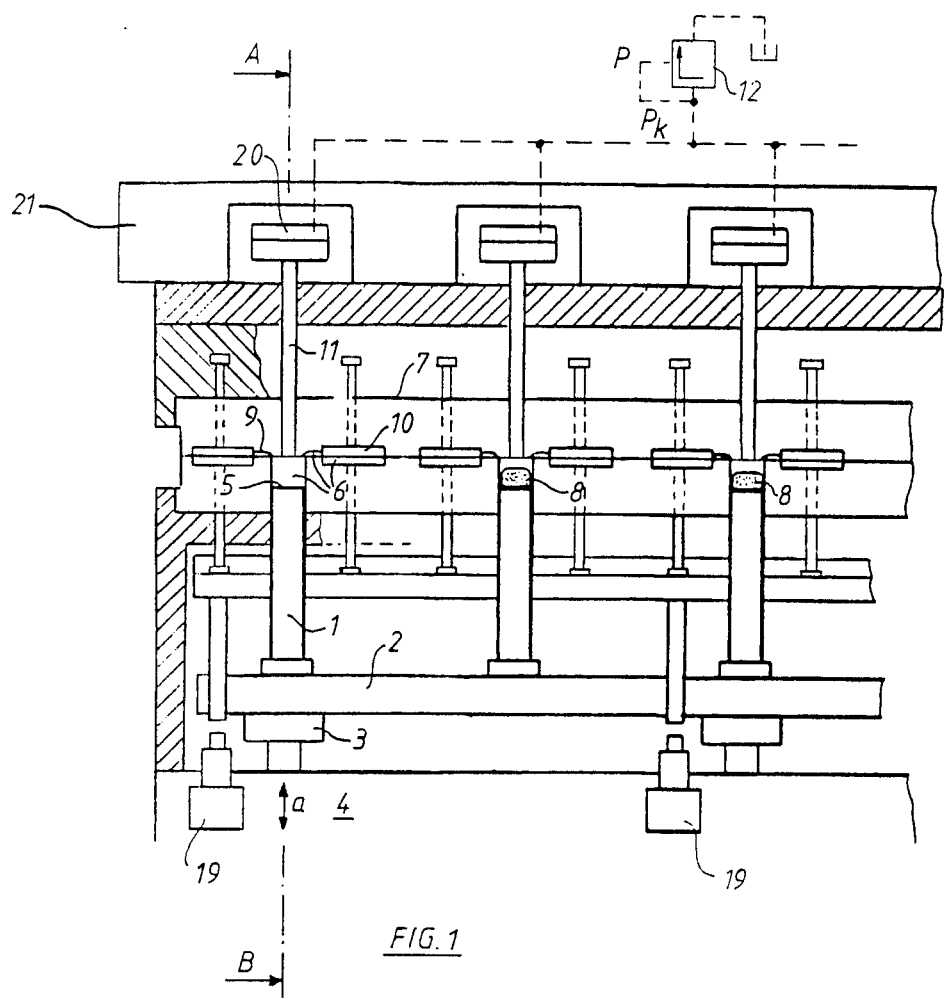
FIG. 1 is a schematic vertical sectional view of a press in accordance with the invention.

Referring now to the drawings in detail, the press shown in FIG. 1 has several injection plungers 1 which are actuated via a crosspiece 2. The crosspiece is connected via coupling elements 3 to a lower, movable part 4 of the press. The press also has a stationary upper part 21. The press part 4 can be raised or lowered in the direction of arrow "a".

The upper end 5 of each of the injection plungers 1 projects into a filling space or pot 6 of an injection mold 7. In the positions shown, the injection plungers 1 have been lowered to the point that the plastics material to be molded 8, can be placed in the filling pots 6 above the injection plungers 1. The plastics material 8 is then heated in the mold 7 and molded under pressure. To do this, the movable part 4 of the press is moved upwardly, so that the injection plungers 1 move upwardly too. The plastics material 8 is thereof forced through channels 9 into cavities 10 of the mold.

In order to enable pressure limiting in the injection mold 7, the press has upper compensating pistons 11 which retreat slightly upwards when a maximum pressure is reached. For this purpose, the compensating pistons 11 are forced downwards with a constant pressure $P_k$ against a fixed stop to the position shown. When the molding pressure exceeds this constant pressure $P_k$ in any of the filling pots 6, the associated compensating piston 11 gives way. As a result, the volume of the respective pot 6 is slightly enlarged, whereby pressure limiting is provided. If, for example, too large a quantity of plastics material 8 is inserted into a pot 6, the associated compensating piston 11 will compensate for this overfeeding. The constant pressure $P_k$ can be set so that, even if the correct quantity of plastics material 8 has been fed in, pressure limiting takes place in the last part of the molding operation, so that high-quality moldings can be produced and scrap would be avoided.

To provide a constant pressure $P_k$ for the compensating pistons 11, use can be made of an adjustable pressure limiter 12 which reduces an applied pressure P to the desired constant molding pressure $P_k$.

Figure 2:
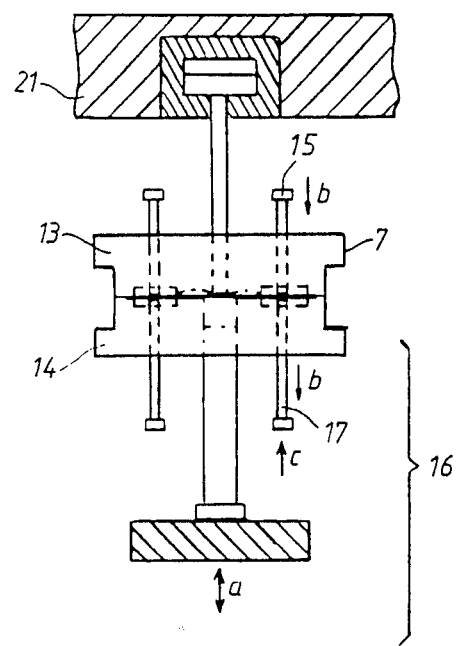
FIG. 2 is a sectional view taken along line A-B of FIG. 1.

FIG. 2 shows a simplified vertical section taken along line A-B of FIG. 1. The injection mold 7 includes an upper part 13 and a lower part 14. For feeding the press and ejecting the molded material, the lower part 14 of the mold is lowered.

To eject the molded material, upper ejectors 15 are moved downwards in the direction of arrow "b", whereby the molded material and the lower part 14 of the mold are lowered, the entire lower part 16 being lowered correspondingly. Then, lower ejectors 17 are pushed upwardly, so that the moldings are ejected from the lower part 14 of the mold. The moldings can then be removed via a suction device (conventional and not shown).

Figure 3:
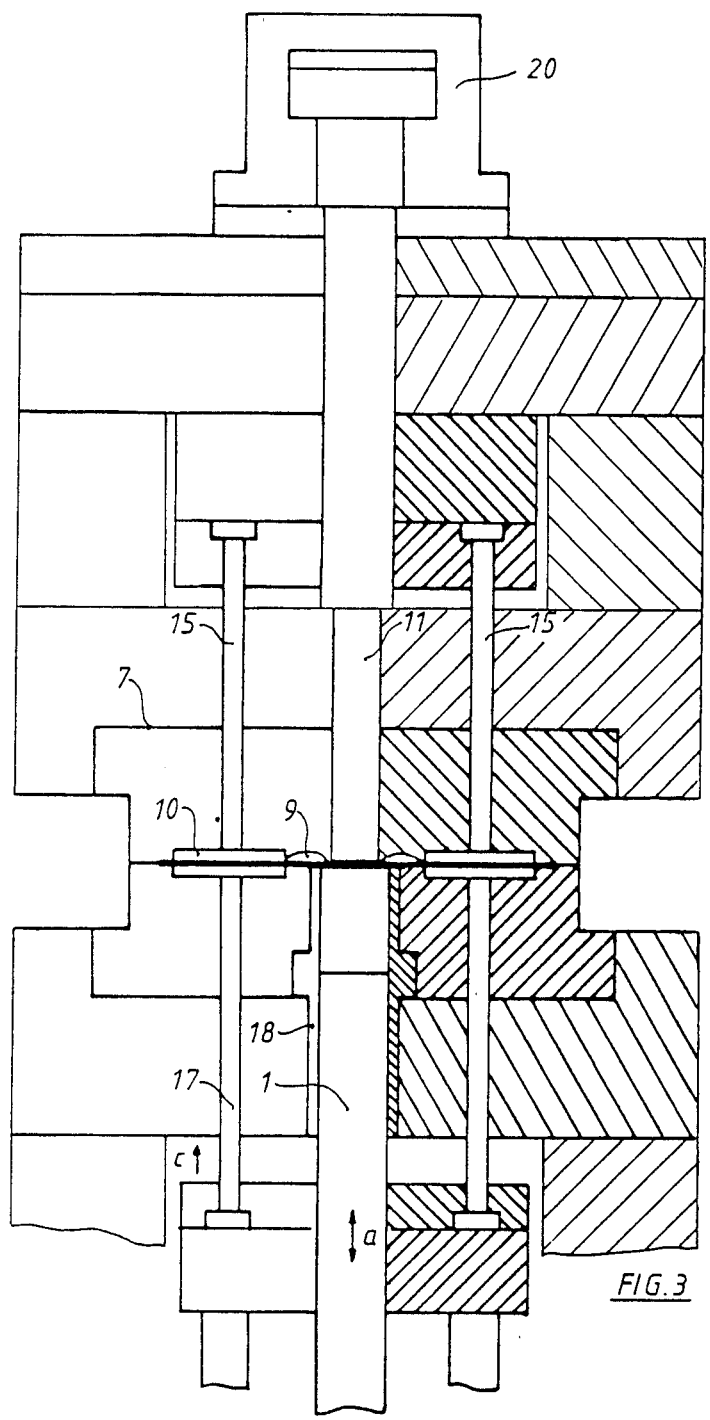
FIG. 3 shows a detail from FIG. 2.

The more detailed partial view of FIG. 3 shows an embodiment of the arrangement of the injection plunger 1 in conjunction with the compensating piston 11 and ejectors 15, 17. The upper end 5 of each injection plunger 1 is guided in a bushing 18. The plastics material in powder or pellet form is placed into the upper area of the bushing 18. In the injection mold 7, two opposite cavities 10 may be associated with each injection plunger 1. In FIGS. 1 and 2, four cavities 10 are associated with each injection plunger. The ejectors 17 may be actuated via hydraulic drives 19, which are schematically shown in FIG. 1. When the injection mold 7 is open, these drives 19 are capable of pushing the ejectors 17 in the direction of arrow "c". The hydraulic cylinders or drives 19 for the lower ejectors 17 are located in the movable part 4 of the press. The hydraulic cylinders 20 for the upper ejectors 15 are mounted in the upper, stationary part 21 of the press.

It will be understood that each of the elements described above, or two or more together, may also find a useful application in other types of presses with a plurality of injection plungers differing from the types described above.

While the invention has been illustrated and described as embodied in a press with a plurality of injection plungers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A press for simultaneously producing a plurality of moldings of plastics, particularly for producing packages of semiconductor circuits, comprising a plurality of injection plungers; at least one injection mold having a plurality of filling pots to be filled with a plastics material, a plurality of channels each connected to the associated pot and a plurality of cavities each connected to the associated channel, each of said injection plungers forcing a heated molding material in the associated pot and through the associated channel into the associated cavity; the injection plungers being provided with a common drive for simultaneously forcing said plungers into the associated pots; and a plurality of pressure-compensating pistons each adjoining a respective pot of said injection mold and each being associated with each of the injection plungers, said injection plungers and respective compensating pistons associated therewith being located opposite each other on a common axis and being laterally spaced from the mold cavities; hydraulic actuating means for actuating said compensating pistons; and means to cause a retreat of said compensation pistons in such a manner that, when a predetermined maximum pressure is reached in the respective pot each of the compensating pistons slightly retreats independently from the other compensating pistons to cause a pressure reduction in said pot.

2. The press as defined in claim 1, wherein said hydraulic actuating means includes for each of the compensating pistons a hydraulic cylinder, each of the hydraulic cylinders having a pressure chamber, the pressure chambers of all the hydraulic cylinders being connected with one another.

3. The press, as defined in claim 2, further including a common pressure limiter connected to the pressure chambers of the hydraulic cylinders.

4. The press as defined in claim 1, wherein each of the filling pots is connected to at least two cavities by said channels, an upper end of each injection plunger and a lower end of the associated compensating piston bounding the associated pot in the area of said channels.

* * * * *